US012131484B1

(12) United States Patent
Yan et al.

(10) Patent No.: US 12,131,484 B1
(45) Date of Patent: Oct. 29, 2024

(54) MULTI-OBJECT TRACKING METHOD BASED ON AUTHENTICITY HIERARCHIZING AND OCCLUSION RECOVERY

(71) Applicant: Zhejiang University, Hangzhou (CN)

(72) Inventors: Yunfeng Yan, Hangzhou (CN); Haoyuan Jin, Hangzhou (CN); Donglian Qi, Hangzhou (CN); Qi Li, Hangzhou (CN); Rui Han, Hangzhou (CN); Bingxiao Mei, Hangzhou (CN); Zezhou Wang, Hangzhou (CN); Gang Chen, Hangzhou (CN)

(73) Assignee: Zhejiang University, Hangzhou (CN)

( * ) Notice: Subject to any disclaimer, the term of this patent is extended or adjusted under 35 U.S.C. 154(b) by 0 days.

(21) Appl. No.: 18/732,676

(22) Filed: Jun. 4, 2024

(30) Foreign Application Priority Data

Sep. 19, 2023 (CN) .......................... 202311213833.1

(51) Int. Cl.
*G06T 7/20* (2017.01)
*G06T 5/20* (2006.01)
(Continued)

(52) U.S. Cl.
CPC ................. *G06T 7/20* (2013.01); *G06T 5/20* (2013.01); *G06T 7/11* (2017.01); *G06V 10/44* (2022.01);
(Continued)

(58) Field of Classification Search
CPC .... G06T 7/20; G06T 5/20; G06T 7/11; G06V 10/44; G06V 10/806; G06V 2201/07
See application file for complete search history.

(56) References Cited

U.S. PATENT DOCUMENTS 11,055,872 B1   7/2021   Chen et al.
2014/0347475 A1  11/2014  Divakaran et al.
2020/0265591 A1   8/2020  Yang et al.

FOREIGN PATENT DOCUMENTS

CN   109636829 A   4/2019
CN   110135314 A   8/2019
(Continued)

OTHER PUBLICATIONS

Li et al., "Multiple Object Tracking With Appearance Feature Prediction and Similarity Fusion", College of Computer Science and Engineering, Shandong University of Science and Technology, Qingdao 266590, China, May 2023 (Year: 2023).*
(Continued)

*Primary Examiner* — Kenny A Cese
(74) *Attorney, Agent, or Firm* — Bayramoglu Law Offices LLC

(57) ABSTRACT

A multi-object tracking method based on authenticity hierarchizing and occlusion recovery relates to the technical field of multi-object tracking for security management and control of complex scenes. The method includes the following steps: image acquisition, object detection, authenticity hierarchizing, hierarchical association and outputting tracks. The multi-object tracking method is helpful to solve the long-term puzzling occlusion problem in the field of multi-object tracking, the constructed new algorithm framework can achieve an advanced tracking performance, improve the adaptability of the method to complex environments, and adapt to more difficult video surveillance security control tasks.

7 Claims, 6 Drawing Sheets
(5 of 6 Drawing Sheet(s) Filed in Color)

(51) Int. Cl.
*G06T 7/11* (2017.01)
*G06V 10/44* (2022.01)
*G06V 10/80* (2022.01)

(52) U.S. Cl.
CPC ........ G06V 10/806 (2022.01); *G06V 2201/07* (2022.01)

(56) References Cited

FOREIGN PATENT DOCUMENTS

| | | | |
|---|---|---|---|
| CN | 114663839 | A | 6/2022 |
| CN | 115240130 | A | 10/2022 |
| CN | 115830075 | A | 3/2023 |
| CN | 115984320 | A | 4/2023 |
| CN | 116128932 | A | 5/2023 |
| CN | 116245916 | A | 6/2023 |
| CN | 116343265 | A | 6/2023 |
| CN | 116433723 | A | 7/2023 |
| CN | 116563345 | A | 8/2023 |
| CN | 116681729 | A | 9/2023 |
| CN | 116758110 | A | 9/2023 |

OTHER PUBLICATIONS

Fang Lan, et al., Multi-object tracking based on adaptive online discriminative appearance learning and hierarchical assosiation, Journal of Image and Graphics, 2020, pp. 708-720, vol. 25 No.4.

* cited by examiner

MULTI-OBJECT TRACKING METHOD BASED ON AUTHENTICITY HIERARCHIZING AND OCCLUSION RECOVERY

CROSS-REFERENCE TO THE RELATED APPLICATIONS

This application is based upon and claims priority to Chinese Patent Application No. 202311213833.1, filed on Sep. 19, 2023, the entire contents of which are incorporated herein by reference.

TECHNICAL FIELD

The present disclosure relates to the technical field of multi-object tracking for security management and control of complex scenes, in particular to a multi-object tracking method based on authenticity hierarchizing and occlusion recovery.

BACKGROUND

Multi-object tracking is an important task in computer vision, its analysis ability of scene personnel has a wide range of applications in key areas such as security management and control of video surveillance. In some of the most advanced methods, tracking by detection is a typical and widely used algorithm paradigm. To solve the dual problems of detection and association, the paradigm constructs a two-stage framework, uses a detector to identify the category objects in video frame images, and then uses similarity information to realize the association of objects and tracks, thereby realizing the online multi-object tracking. The related methods show excellent tracking performance on various multi-object datasets.

However, there are still many challenges that have not been fully solved, such as occlusion, camera motion, image blur etc. Wherein, occlusion in complex scenes is a particularly common and severe factor. Aiming at the problem of reducing the visible area of the object due to occlusion, some work has explored some potential solutions using semantic segmentation, depth estimation and so on. Although these have played a certain role in improving, the effect is still very limited, resulting in the method can not achieve satisfactory results in complex scenes.

Through an in-depth study of the tracking paradigm through detection, it can be seen that the occlusion phenomenon has a greater impact on the three aspects of the tracking method: firstly, the detection score output by the detector will not be able to accurately evaluate the existence of the occluded objects, which will cause the partially occluded object to be discarded together with the false detection object due to low scores; secondly, an overlap degree measures the overlap degree of visible regions between the occluded objects, which can not reflect the position similarity of the real region; and finally, the appearance features of occluded objects extracted by a common person re-identification module are very limited and have low reliability, which cannot provide effective appearance similarity.

Therefore, it is an urgent problem for those skilled in the art to provide a multi-object tracking method based on authenticity hierarchizing and occlusion recovery, which can solve the long-term puzzling occlusion problem in the field of multi-object tracking, achieve an advanced tracking performance, improve the adaptability of the method to complex environments, and adapt to more difficult security management and control tasks of video surveillance.

SUMMARY

In view of this, the present disclosure provides a multi-object tracking method based on authenticity hierarchizing and occlusion recovery, which can achieve an advanced tracking performance, improve the adaptability of the method to complex environments and improve the effectiveness and robustness of the hierarchical association strategy.

In order to achieve the above objective, the present disclosure adopts the following technical solutions:

a multi-object tracking method based on authenticity hierarchizing and occlusion recovery, including the following steps:

S1, image acquisition: acquiring video frame images to be tested;

S2, object detection: inputting the video frame images in S1 into a trained YOLOX model for a category object detection, and outputting regional coordinates and confidences of all detection objects in the video frame images;

S3, authenticity hierarchizing: performing an authentic assessment on the detection objects obtained in S2 by using existence scores of a comprehensive index, and using confidences corresponding to the detection objects to calculate the existence scores; dividing the detection objects into high-authenticity detection objects and low-authenticity detection objects by setting a score threshold;

S4, hierarchical association: preferentially associating the high-authenticity detection objects with predicted tracks based on the hierarchical results of the detection objects in S3 in combination with a hierarchical association strategy, an association basis including a position similarity basis and an appearance similarity basis, measuring the position similarity basis by a recovery overlap degree combined with occlusion recovery preprocessing, obtaining the appearance similarity basis by an occlusion person re-identification module, and using a similarity fusion matrix for combination; associating the low-authenticity detection objects with unmatched predicted tracks, and an association basis is a position similarity; and S5, outputting tracks: in the process of high-authenticity association in S4, using the matched detection objects to update the corresponding predicted tracks, using unmatched detection objects to create new predicted tracks, passing the unmatched predicted tracks into a low-authenticity association link for a secondary association, using the matched detection objects to update corresponding predicted tracks, determining the unmatched detection objects as false detection discarding, and deleting the unmatched predicted tracks after retaining a preset time.

Optionally, in S2, using a COCO pre-training weight in the YOLOX model, and completing training and testing on pedestrian datasets CrowdHuman, Cityperson, ETHZ and multi-object tracking data MOT17 and MOT20.

Optionally, in S3, the confidences corresponding to the detection objects include object confidences and category confidences;

a calculation method of the existence score is: $S_e = (p_{object}{}^{\alpha} p_{class}{}^{1-\alpha})$, wherein, $p_{object}$ is the object confidence and represents the detection including a certainty of a category object and an accuracy of an object region positioning; $p_{class}$ is the category confidence and represents an accuracy of detection category prediction; α is a hyper-parameter, as a weight of the object confidence and the category confidence for a final score, and a value range of α is [0, 1], α is set to 0.9; and a value range of the existence score Se is [0, 1].

Optionally, in S4, an association method of the detection objects and the predicted tracks includes: using a Hungarian matching algorithm in the multi-object tracking method to achieve the association, wherein an output includes successfully matched detection objects and predicted tracks, unmatched detection objects and unmatched predicted tracks.

Optionally, in S4, steps of the occlusion recovery preprocessing include:

S4011, inputting a predicted track coordinate $B^T$ and a detection object coordinate $B^D$:

$$B^T=(x_1^T,y_1^T,x_2^T,y_2^T), B^D=(x_1^D,y_1^D,x_2^D,y_2^D);$$

wherein, $x_1^T$, $y_1^T$ and $x_1^D$, $y_1^D$ are coordinates of a lower left corner of the predicted track and the detection object, $x_2^T$, $y_2^T$ and $x_2^D$, $y_2^D$ are coordinates of an upper right corner of the predicted track and the detection object;

S4012, calculating a width $w^T$ and a height $h^T$ of the predicted track and a width $w^D$ and a height $h^D$ of the detection object:

$$w^T=x_2^T-x_1^T, h^T=y_2^T-y_1^T, w^D=x_2^D-x_1^D, h^D=y_2^D-y_1^D;$$

S4013, calculating a center point $C^T$ of the predicted track and a center point $C^D$ of the detection object:

$$C^T = (x_c^T, y_c^T) = \left(x_1^T + \frac{w^T}{2}, y_1^T + \frac{h^T}{2}\right),$$

$$C^D = (x_c^D, y_c^D) = \left(x_1^D + \frac{w^D}{2}, y_1^D + \frac{h^D}{2}\right);$$

S4014, calculating a maximum width w' and a maximum height h' of the predicted track and the detection object:

$$w'=\max(w^T,h^T), h'=\max(w^D,h^D);$$

S4015, calculating a width $\hat{w}^T$ and a height $\hat{h}^T$ of the predicted track and a width $\hat{w}^D$ and a height $\hat{h}^D$ of the detection object after an occlusion recovery operation:

$$\hat{w}^T=w^T+\beta(w'-w^T), \hat{h}^T=h^T+\beta(h'-h^T),$$

$$\hat{w}^D=w^D+\beta(w'-w^D), \hat{h}^D=h^D+\beta(h'-h^D);$$

wherein, β is an occlusion recovery parameter, indicating a degree of occlusion recovery, and β is set to 2; and S4016, outputting a coordinate $\hat{B}^T$ of the predicted track after recovery and a coordinate $\hat{B}^D$ of the detection object after recovery, and keeping the center point unchanged in the recovery process:

$$\hat{B}^T = (\hat{x}_1^T, \hat{y}_1^T, \hat{x}_2^T, \hat{y}_2^T) = \left(x_c^T - \frac{\hat{w}^T}{2}, y_c^T - \frac{\hat{h}^T}{2}, x_c^T + \frac{\hat{w}^T}{2}, y_c^T + \frac{\hat{h}^T}{2}\right),$$

$$\hat{B}^D = (\hat{x}_1^D, \hat{y}_1^D, \hat{x}_2^D, \hat{y}_2^D) = \left(x_c^D - \frac{\hat{w}^D}{2}, y_c^D - \frac{\hat{h}^D}{2}, x_c^D + \frac{\hat{w}^D}{2}, y_c^D + \frac{\hat{h}^D}{2}\right).$$

Optionally, in S4, the occlusion person re-identification module is an independent embedded module based on Transformer, the occlusion person re-identification module adopts a ViT model to pre-train on ImageNet-21K and uses a weight after ImageNet1 K fine-tuning as an initial weight, then completes training and testing on MOT17 and MOT20; and the occlusion person re-identification module is configured to extract effective appearance features for re-identification from a limited visible region of occluded objects as the appearance similarity basis.

Optionally, in S4, the acquisition of the appearance similarity basis includes the following steps:

S4021, intercepting region images from the video frames according to the coordinates of the detection objects and the predicted tracks, after a size adjustment, as an input $m \in \mathbb{R}$ H×W×C of the occlusion person re-identification module, wherein, H, W and C are height, width and channel number, respectively;

S4022, segmenting adjusted images into N fixed-size image blocks $\{m_p{}^n|n=1, 2, \ldots, N\}$, inputting a linear projection layer, and adding extra learnable category embedded tokens;

S4023, after inputting a 1–1-layer Transformer encoder, transmitting an initial coding to a global branch and a recombination branch, respectively, wherein the global branch outputs a global feature $f_g$, the recombination branch recombines the image blocks to output k local features $[f_{l_1}, f_{l_2}, \ldots, f_{l_k}]$; and S4024, splicing the global feature and the k local features to obtain integration appearance features:

$$f_i=[f_g,f_{l_1},f_{l_2},\ldots,f_{l_k}].$$

Optionally, in S4, the similarity fusion matrix is calculated as follows:

$$C_{ij} = \begin{cases} \min(d_{ij}^{riou}, \xi d_{ij}^{cos}), & \text{if } d_{ij}^{cos} \leq \theta_{emb_l} \\ \min(d_{ij}^{riou}, d_{ij}^{cos}), & \text{if } d_{ij}^{riou} \leq \theta_{riou}, \theta_{emb_l} < d_{ij}^{cos} \leq \theta_{emb_h} ; \\ d_{ij}^{riou}, & \text{otherwise} \end{cases}$$

wherein, $C_{ij}$ is a similarity loss of an $i^{th}$ predicted track and a $j^{th}$ detection object, $d_{ij}^{riou}$ is a recovery overlap distance between two detection regions and represents a position similarity, $d_{ij}^{cos}$ is a normalized cosine distance between two appearance features $e_i^t$ and $f_j^t$ and represents an appearance similarity; ξ is a weight parameter of the normalized cosine distance, and ξ is set to 0.8; and $\theta_{riou}$ is a threshold of the recovery overlap distance, $\theta_{emb_l}$ and $\theta_{emb_h}$ are high and low thresholds of the normalized cosine distance, respectively.

Optionally, in S5, a method of updating the predicted tracks is as follows: an exponential moving average mode is used instead of a feature library to update appearance features of the matched predicted tracks, $$e_i^t=\gamma e_i^{t-1}+(1-\gamma)f_i^t;$$

wherein, $e_i^t$ and $e_i^{t-1}$ are the comprehensive appearance features of an $i^{th}$ predicted track of a current video frame t and a previous frame t−1, respectively, $f_i^t$ is an output feature of the occlusion person re-identification module of the current video frame t, and an update parameter γ is set to 0.9 in the present disclosure.

Optionally, in S5, methods of update, creation and deletion of the predicted tracks are as follows: a track update task uses a Kalman filter as a linear motion model, and updates the predicted track coordinates by regional coordinate information of the successfully matched detection objects; a track creation task is only used for the unmatched detection objects in the high-authenticity association link, and taking the unmatched detection objects as new tracks; and a track deletion task is for the unmatched prediction tracks of the low-authenticity association link, setting a prediction track to retain a number of frames, after reaching the number of frames, the predicted track is deleted directly and not restored.

According to the above technical solutions, compared with the prior art, the present disclosure provides a multi-object tracking method based on authenticity hierarchizing and occlusion recovery, which has the following beneficial effects: the present disclosure can effectively solve the long-term puzzling occlusion problem in the field of multi-object tracking, the constructed new algorithm framework can achieve an advanced tracking performance, improve the adaptability of the method to complex environments, and adapt to more difficult security management and control tasks of video surveillance; according to the method of the present disclosure, the existence score replaces the roughly designed detection score, by effectively evaluating the authenticity of the occluded objects, avoiding a large number of occluded objects being discarded by the tracking process, and improving the effectiveness and robustness of the hierarchical association strategy; according to the the method of the present disclosure, the recovery overlap based on the occlusion recovery pre-processing method effectively compensates for the difference between the visible region and the real region of the occluded objects, improving the reliability of the appearance similarity; and according to the method of the present disclosure, the occlusion person re-identification module extracts effective appearance features from a limited visible region and overcomes the dependence on the quality of the detected object, which has important theoretical and practical significance.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

In order to more clearly illustrate the embodiments of the present disclosure or technical solutions in the related art, the accompanying drawings used in the embodiments or the related art will now be described briefly. It is obvious that the drawings in the following description are only the embodiment of the disclosure, and that those skilled in the art can obtain other drawings from these drawings without any creative efforts.

DETAILED DESCRIPTION OF THE EMBODIMENTS

In the following, the technical solutions in the embodiments of the present disclosure will be clearly and completely described with reference to the drawings in the embodiments of the present disclosure. Obviously, the described embodiments are only a part of the embodiments of the present disclosure, but not all the embodiments thereof. Based on the embodiments of the present disclosure, all other embodiments obtained by those skilled in the art without any creative efforts shall fall within the scope of the present disclosure.

In the present application, relational terms such as "first" and "second" are merely used to distinguish one entity or operation from another entity or operation without necessarily requiring or implying any actual relationship or order between such entities or operations; and a term "include", "comprise" or any other variant thereof is intended to cover a non-exclusive inclusion, so that a process, a method, an article, or a device that includes a series of elements not only includes those elements but also includes other elements that are not expressly listed, or further includes elements inherent to such a process, method, article, or device. Without further limitation, an element defined by the phrase "including a/an . . . " does not exclude the presence of additional identical elements in the process, method, article or device that includes the element.

Figure 1:
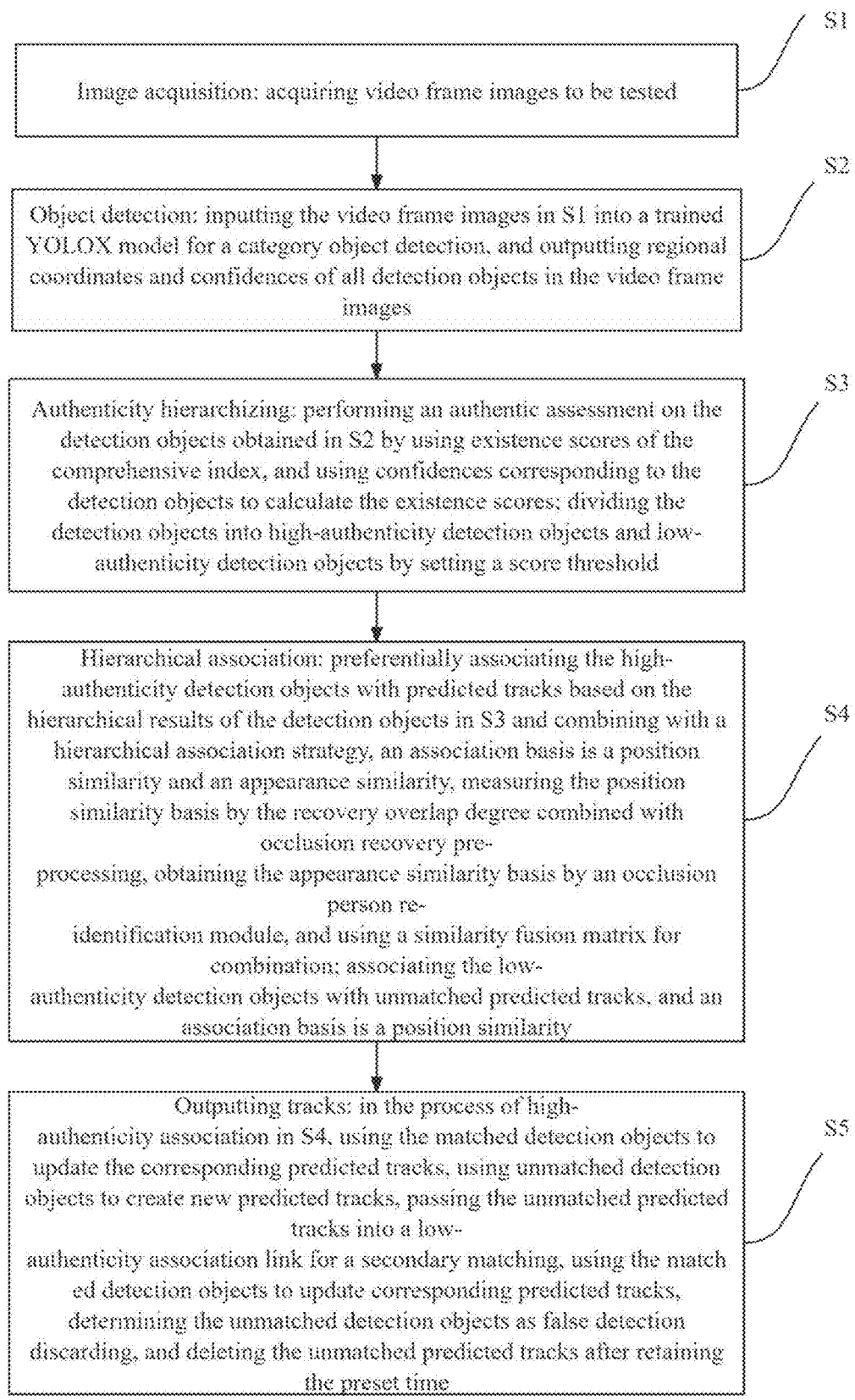
FIG. 1 is a flow chart of a multi-object tracking method based on authenticity hierarchizing and occlusion recovery disclosed by the present disclosure.

Referring to FIG. 1, the present disclosure discloses a multi-object tracking method based on authenticity hierarchizing and occlusion recovery, including the following steps:

S1, image acquisition: acquiring video frame images to be tested;

S2, object detection: inputting the video frame images in S1 into a trained YOLOX model for a category object detection, and outputting regional coordinates and confidences of all detection objects in the video frame images;

S3, authenticity hierarchizing: performing an authentic assessment on the detection objects obtained in S2 by using existence scores of the comprehensive index, and using confidences corresponding to the detection objects to calculate the existence scores; dividing the detection objects into high-authenticity detection objects and low-authenticity detection objects by setting a score threshold;

S4, hierarchical association: preferentially associating the high-authenticity detection objects with predicted tracks based on the hierarchical results of the detection objects in S3 in combination with a hierarchical association strategy, an association basis including a position similarity basis and an appearance similarity basis, measuring the position similarity basis by a recovery overlap degree combined with occlusion recovery pre-processing, obtaining the appearance similarity basis by an occlusion person re-identification module, and using a similarity fusion matrix for combination; associating the low-authenticity detection objects with unmatched predicted tracks, and an association basis is a position similarity; and S5, outputting tracks: in the process of high-authenticity association in S4, using matched detection objects to update the corresponding predicted tracks, using unmatched detection objects to create new predicted tracks, passing the unmatched predicted tracks into a low-authenticity association link for a secondary association, using the matched detection objects to update corresponding predicted tracks, determining the unmatched detection objects as false detection discarding, and deleting the unmatched predicted tracks after retaining a preset time.

Further, in S2, using a COCO pre-training weight in the YOLOX model, and completing training and testing on pedestrian datasets CrowdHuman, Cityperson, ETHZ and multi-object tracking data MOT17 and MOT20.

Figure 3:
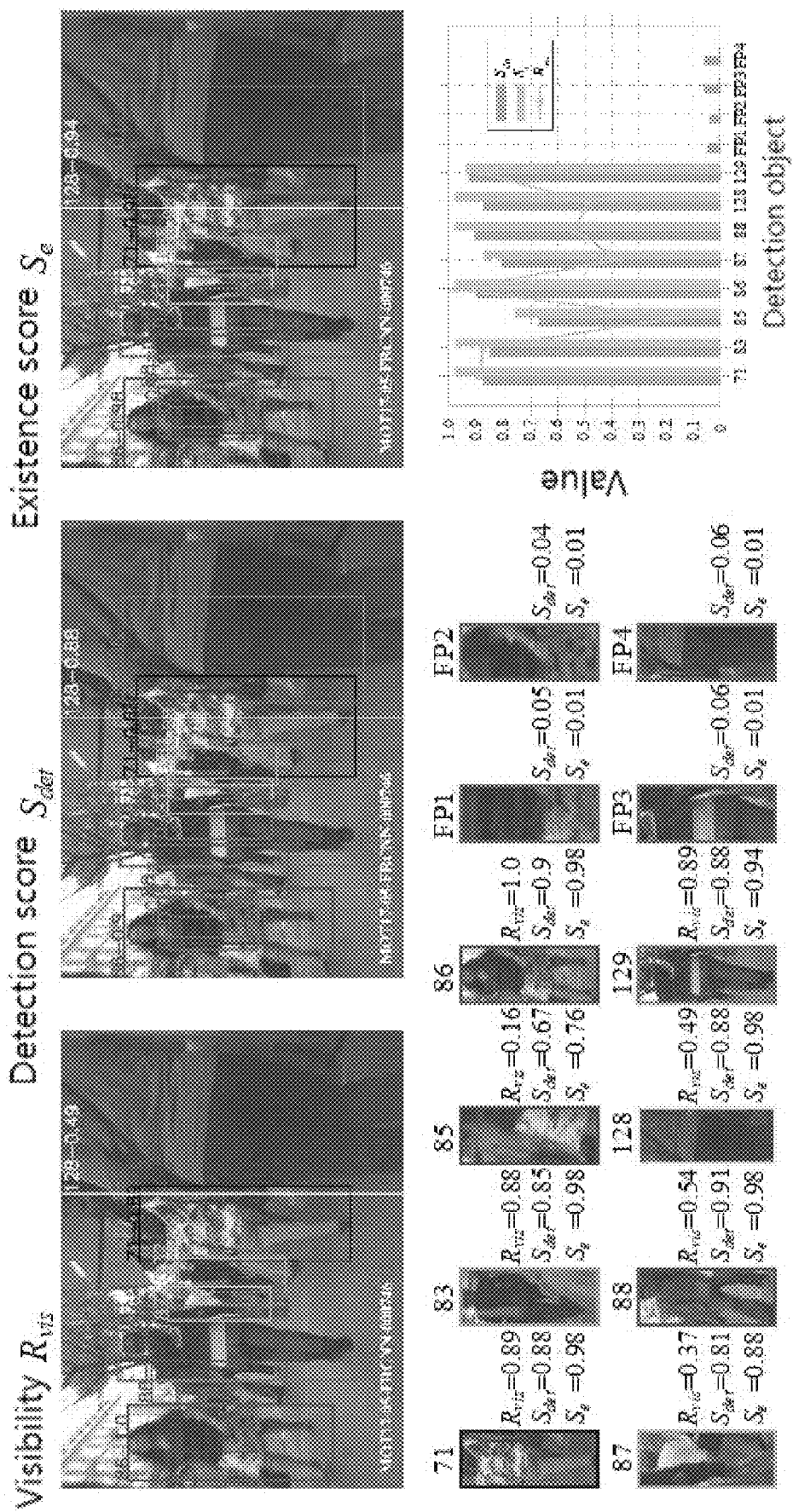
FIG. 3 is a visual schematic diagram of score comparison disclosed by the present embodiment.

Further, referring to FIG. 3, in S3, the confidences corresponding to the detection objects include object confidences and category confidences;

a calculation method of the existence score is: $S_e = (p_{object}^{\alpha} p_{class}^{1-\alpha})^2$, wherein, $p_{object}$ is the object confidence and represents the detection including a certainty of a category object and an accuracy of an object region positioning; $p_{class}$ is the category confidence and represents an accuracy of detection category prediction; $\alpha$ is a hyper-parameter, as a weight of the object confidence and the category confidence for a final score, and a value range of $\alpha$ is [0, 1], $\alpha$ is set to 0.9; and a value range of the existence score Se is [0, 1].

Further, in S4, an association method of the detection objects and the predicted tracks includes: using a Hungarian matching algorithm in the multi-object tracking method to achieve the association, wherein an output includes successfully matched detection objects and predicted tracks, unmatched detection objects and unmatched predicted tracks.

Figure 4:
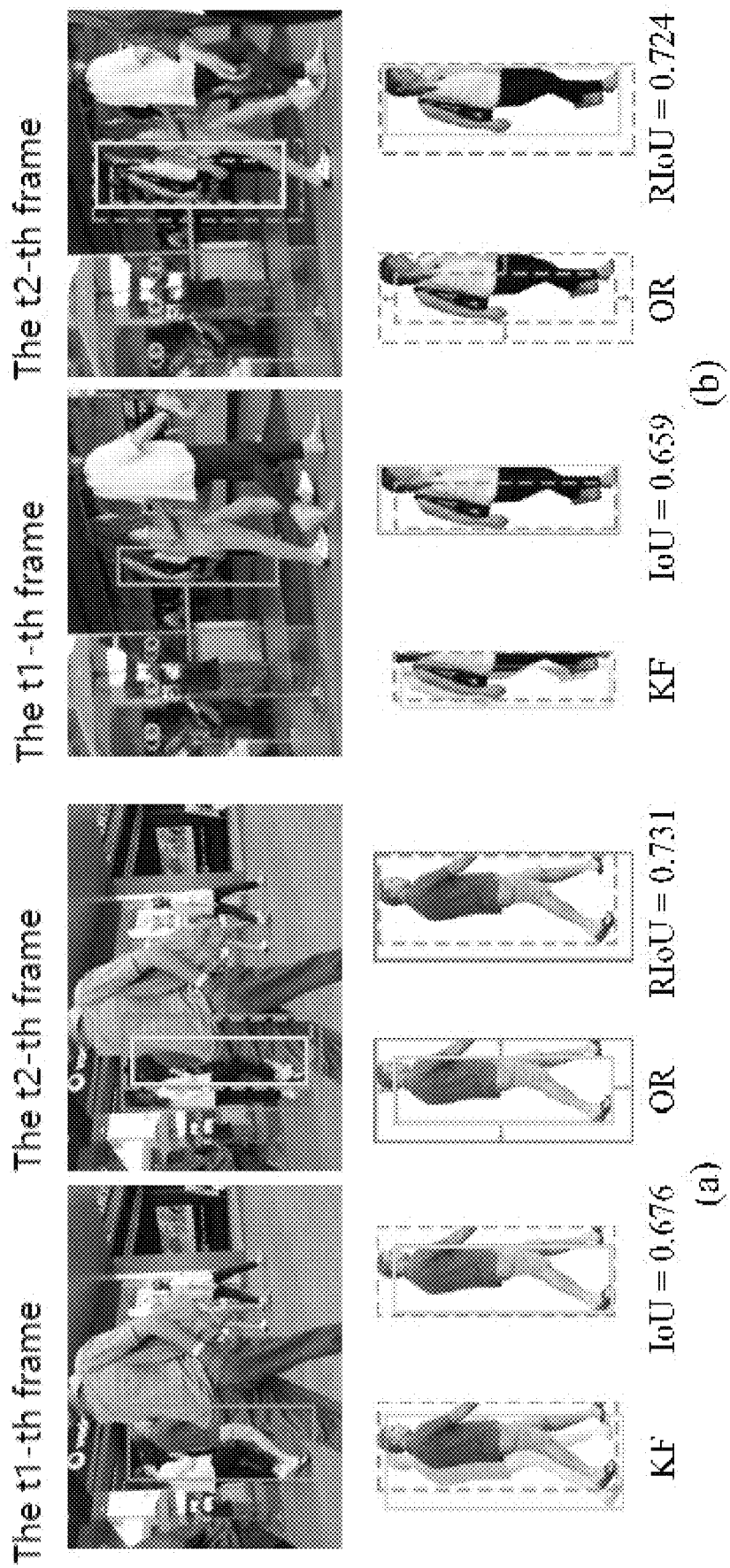
FIG. 4 is a visual schematic diagram of occlusion recovery pre-processing disclosed by the present embodiment.

Further, referring to FIG. 4, in S4, steps of the occlusion recovery pre-processing include:

S4011, inputting a predicted track coordinate $B^T$ and a detection object coordinate $B^D$:

$$B^T=(x_1^T,y_1^T,x_2^T,y_2^T),\ B^D=(x_1^D,y_1^D,x_2^D,y_2^D);$$

wherein, $x_1^T, y_1^T$ and $x_1^D, y_1^D$ are coordinates of a lower left corner of the predicted track and the detection object, $x_2^T, y_2^T$ and $x_2^D, y_2^D$ are coordinates of an upper right corner of the predicted track and the detection object;

S4012, calculating a width $w^T$ and a height $h^T$ of the predicted track and a width $w^D$ and a height h" of the detection object:

$$w^T=x_2^T-x_1^T,\ h^T=y_2^T-y_1^T,\ w^D=x_2^D-x_1^D,\ h^D=y_2^D-y_1^D;$$

S4013, calculating a center point $C^T$ of the predicted track and a center point $C^D$ of the detection object:

$$C^T = (x_c^T, y_c^T) = \left(x_1^T + \frac{w^T}{2}, y_1^T + \frac{h^T}{2}\right),$$

$$C^D = (x_c^D, y_c^D) = \left(x_1^D + \frac{w^D}{2}, y_1^D + \frac{h^D}{2}\right);$$

S4014, calculating a maximum width $w^r$ and a maximum height $h^r$ of the predicted track and the detection object:

$$w^r=\max(w^T,h^T),\ h^r=\max(w^D,h^D);$$

S4015, calculating a width $\hat{w}^T$ and a height $\hat{h}^T$ of the predicted track and a width $\hat{w}^D$ and a height $\hat{h}^D$ of the detection object after an occlusion recovery operation:

$$\hat{w}^T=w^T+\beta(w^r-w^T),\ \hat{h}^T=h^T+\beta(h^r-h^T),$$

$$\hat{w}^D=w^D+\beta(w^r-w^D),\ \hat{h}^D=h^D+\beta(h^r-h^D);$$

wherein, $\beta$ is an occlusion recovery parameter, indicating a degree of occlusion recovery, and $\beta$ is set to 2; and S4016, outputting a coordinate $\hat{\beta}^T$ of the predicted track after recovery and a coordinate $\hat{\beta}^D$ of the detection object after recovery, and keeping the center point unchanged in the recovery process:

$$\hat{B}^T = (\hat{x}_1^T, \hat{y}_1^T, \hat{x}_2^T, \hat{y}_2^T) = \left(x_c^T - \frac{\hat{w}^T}{2}, y_c^T - \frac{\hat{h}^T}{2}, x_c^T + \frac{\hat{w}^T}{2}, y_c^T + \frac{\hat{h}^T}{2}\right),$$

$$\hat{B}^D = (\hat{x}_1^D, \hat{y}_1^D, \hat{x}_2^D, \hat{y}_2^D) = \left(x_c^D - \frac{\hat{w}^D}{2}, y_c^D - \frac{\hat{h}^D}{2}, x_c^D + \frac{\hat{w}^D}{2}, y_c^D + \frac{\hat{h}^D}{2}\right).$$

Figure 5:
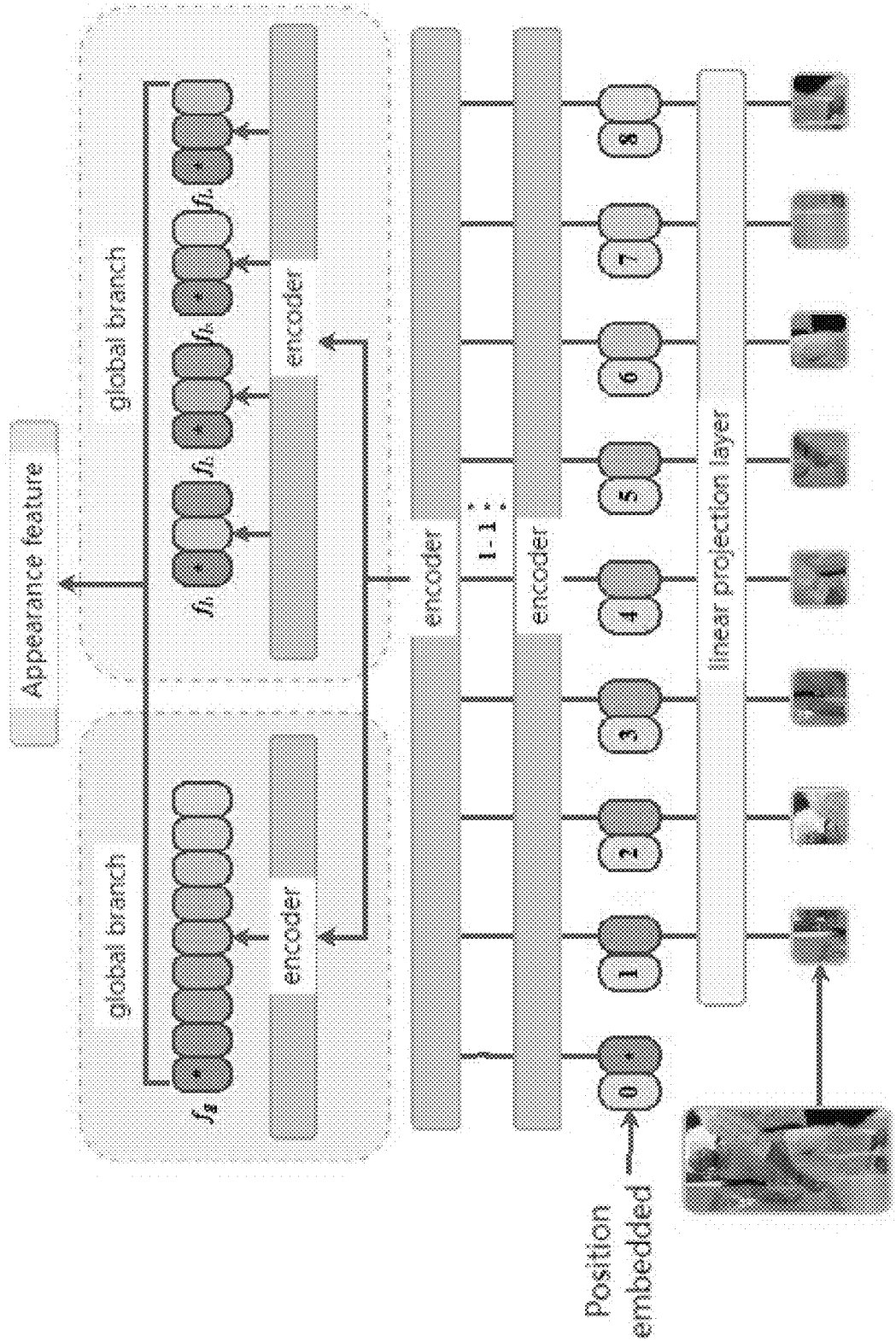
FIG. 5 is a structure diagram of an occlusion person re-identification module disclosed by the present embodiment.

Further, referring to FIG. 5, is S4, the occlusion person re-identification module is an independent embedded module based on Transformer, the occlusion person re-identification module adopts a ViT model to pre-train on ImageNet-21K and uses a weight after ImageNet1 K fine-tuning as an initial weight, then completes training and testing on MOT17 and MOT20; and the occlusion person re-identification module is configured to extract effective appearance features for re-identification from a limited visible region of occluded objects as the appearance similarity basis.

Further, in S4, the acquisition of the appearance similarity basis includes the following steps:

S4021, intercepting region images from the video frames according to the coordinates of the detection objects and the predicted tracks, after a size adjustment, as an input $m \in \mathbb{R} H \times W \times C$ of the occlusion person re-identification module, wherein, H, W and C are height, width and channel number, respectively;

S4022, segmenting adjusted images into N fixed-size image blocks $\{m_p^n | n=1, 2, \ldots, N\}$, inputting a linear projection layer, and adding extra learnable category embedded tokens;

S4023, after inputting a 1–1-layer Transformer encoder, transmitting an initial coding to a global branch and a recombination branch, respectively, wherein the global branch outputs a global feature $f_g$, the recombination branch recombines the image blocks to output k local features $[f_{l_1}, f_{l_2}, \ldots, f_{l_k}]$; and S4024, splicing the global feature and the k local features to obtain integration appearance features:

$$f_i = [f_g, f_{l_1}, f_{l_2}, \ldots, f_{l_k}].$$

Further, in S4, the similarity fusion matrix is calculated as follows:

$$C_{ij} = \begin{cases} \min(d_{ij}^{riou}, \xi d_{ij}^{cos}), & \text{if } d_{ij}^{cos} \leq \theta_{emb_l} \\ \min(d_{ij}^{riou}, d_{ij}^{cos}), & \text{if } d_{ij}^{riou} \leq \theta_{riou}, \theta_{emb_l} < d_{ij}^{cos} \leq \theta_{emb_h} ; \\ d_{ij}^{riou}, & \text{otherwise} \end{cases}$$

wherein, $C_{ij}$ is a similarity loss of an $i^{th}$ predicted track and a $j^{th}$ detection object, $d_{ij}^{riou}$ is a recovery overlap distance between two detection regions and represents the position similarity, $d_{ij}^{cos}$ is a normalized cosine distance between two appearance features $e_i^t$ and $f_j^t$ and represents an appearance similarity; $\xi$ is a weight parameter of the normalized cosine distance, and $\xi$ is set to 0.8; and $\theta_{riou}$ is a threshold of the recovery overlap distance, $\theta_{emb_l}$ and $\theta_{emb_h}$ are high and low thresholds of the normalized cosine distance, respectively.

Further, in S5, a method of updating the predicted tracks is as follows: an exponential moving average mode is used instead of a feature library to update appearance features of the matched predicted tracks, $$e_i^t = \gamma e_i^{t-1} + (1-\gamma) f_i^t;$$

wherein, $e_i^t$ and $e_i^{t-1}$ are the comprehensive appearance features of an $i^{th}$ predicted track of a current video frame t and a previous frame t−1, respectively, $f_i^t$ is an output feature of the occlusion person re-identification module of the current video frame t, and an update parameter $\gamma$ is set to 0.9 in the present disclosure.

Further, in S5, methods of update, creation and deletion of the predicted tracks are as follows: a track update task uses a Kalman filter as a linear motion model, and updates the predicted track coordinates by regional coordinate information of the successfully matched detection objects; a track creation task is only used for the unmatched detection objects in the high-authenticity association link, and taking the unmatched detection objects as new tracks; and a track deletion task is for the unmatched prediction tracks of the low-authenticity association link, setting a prediction track to retain a number of frames, after reaching the number of frames, the predicted track is deleted directly and not restored.

Figure 2:
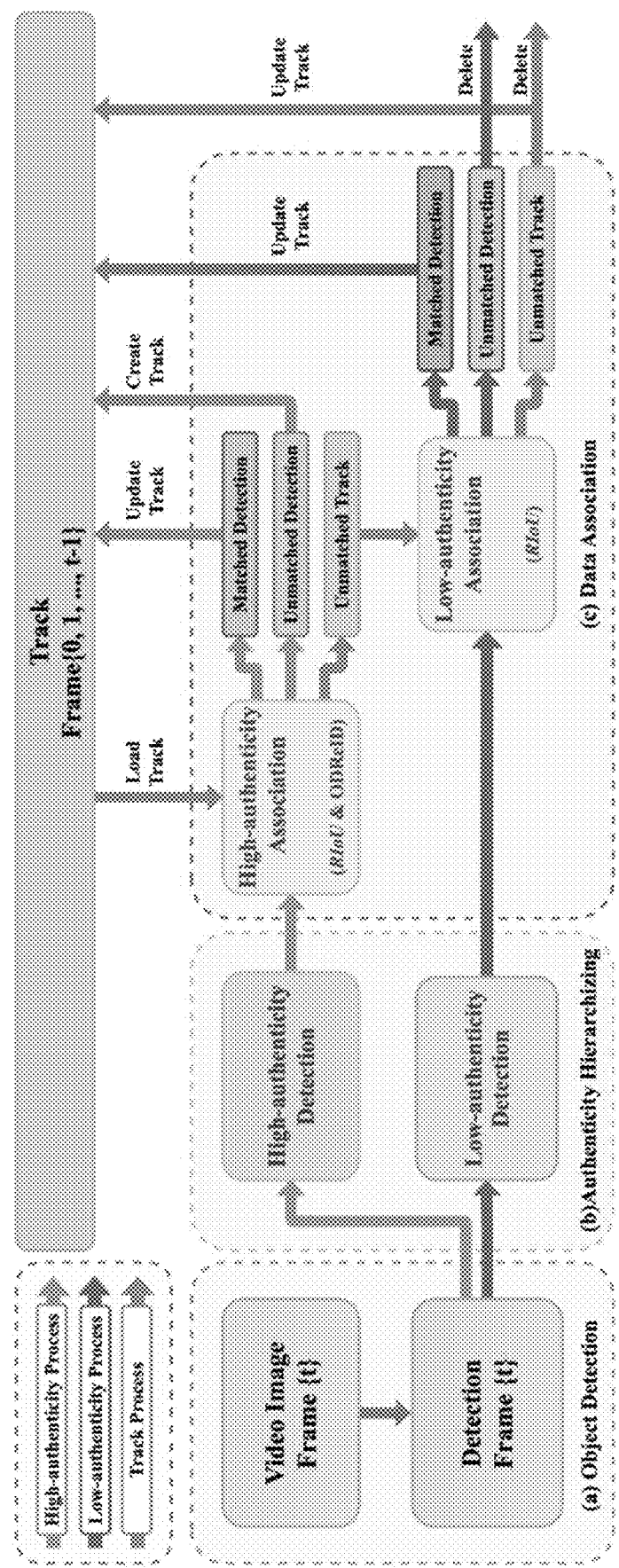
FIG. 2 is a schematic diagram of a multi-object tracking method based on authenticity hierarchizing and occlusion recovery disclosed by the present embodiment.
Figure 6:
FIG. 6 is a visual schematic diagram of a verification effect of data set disclosed by the present embodiment.

Referring to FIG. 2, in an embodiment of the present disclosure, the experimental verification is performed on the multi-object tracking public data sets MOT17 and MOT20, and the specific experimental settings and results are as follows:

the MOT17 consists of a training set of 7 sequences of 5316 video frames and a testing set of 7 sequences of 5919 video frames, which contains a variety of complex scenes such as environment, light and so on; while the MOT20 consists of a training set of 4 sequences of 8931 video frames and a testing set of 4 sequences of 4479 video frames, which contains scenes with more denser crowds;

selecting the CLEAR index to evaluate the method provided by the present disclosure, including FP、FN、IDs、MOTA、HOTA、IDF1 and FPS; where, MOTA is calculated and obtained based on FP, FN and IDs to focus on the detection performance, IDF1 can evaluate the identity retention ability to focus on the performance of the association, HOTA is a high-order tracking accuracy to comprehensively evaluate the effects of detection, association and localization, in addition, FPS reflects the real-time performance of the tracking method;

the method completes the training of the object detection module and the occlusion person re-identification module on four NVIDIA Tesla A100 GPUs, and the inference verification is performed on a single GPU, the specific training data and important hyperparameters have been mentioned in the relevant steps;

the verification results of the MOT17 testing set are shown in Table 1, the verification results of the MOT20 testing set are shown in Table 2, in order to illustrate the excellent performance of the method, some of the most advanced algorithms are listed for comparison, and the optimal results are coarsened; in addition, at the same time, the experimental results with and without occlusion person re-identification module are listed, "*" means that contains the module; the visual schematic diagram of the verification effect of data sets which include MOT17 and MOT20 is shown in FIG. 6; the verification results of the core components of methods are shown in Table 3, and the verification is performed on the verification set of MOT17;

TABLE 1

Verification results of MOT17 testing set

| Method | MOTA↑ | IDF1↑ | HOTA↑ | FP↓ | FN↓ | IDs↓ | FPS↑ |
|---|---|---|---|---|---|---|---|
| SOTMOT | 71.0 | 71.9 | — | 39537 | 118983 | 5284 | 16.0 |
| GSDT | 73.2 | 66.5 | 55.2 | 26397 | 120666 | 3891 | 4.9 |
| RelationTrack | 73.8 | 74.7 | 61.0 | 27999 | 118623 | 1374 | 8.5 |
| PermaTrackPr | 73.8 | 68.9 | 55.5 | 28998 | 115104 | 3699 | 11.9 |
| CSTrack | 74.9 | 72.6 | 59.3 | 23847 | 114303 | 3567 | 15.8 |
| FUFET | 76.2 | 68.0 | 57.9 | 32796 | 98475 | 3237 | 6.8 |
| SiamMOT | 76.3 | 72.3 | — | — | — | — | 12.8 |
| ReMOT | 77.0 | 72.0 | 59.7 | 33204 | 93612 | 2853 | 1.8 |
| OCSORT | 78.0 | 77.5 | 63.2 | 15129 | 107055 | 1950 | 29.0 |
| StrongSORT | 78.3 | 78.5 | 63.5 | — | — | 1446 | 7.5 |
| MAATrack | 79.4 | 75.9 | 62.0 | 37320 | 77661 | 1452 | 189.1 |
| ByteTrack | 80.3 | 77.3 | 63.1 | 25491 | 83721 | 2196 | 29.6 |
| The method of the disclosure | 82.3 | 80.7 | 65.6 | 27540 | 70566 | 1533 | 43.1 |
| The method of the disclosure* | 82.6 | 81.6 | 66.0 | 26814 | 70140 | 1443 | 31.7 |

TABLE 2

Verification results of the MOT20 testing set

| Method | MOTA↑ | IDF1↑ | HOTA↑ | FP↓ | FN↓ | IDs↓ | FPS↑ |
|---|---|---|---|---|---|---|---|
| CSTrack | 66.6 | 68.6 | 54.0 | 25404 | 144358 | 3196 | 4.5 |
| GSDT | 67.1 | 67.5 | 53.6 | 31913 | 135409 | 3131 | 0.9 |
| SiamMOT | 67.1 | 69.1 | — | — | — | — | 4.3 |
| RelationTrack | 67.2 | 70.5 | 56.5 | 61134 | 104597 | 4243 | 2.7 |
| SOTMOT | 68.6 | 71.4 | — | 57064 | 101154 | 4209 | 8.5 |
| StrongSORT | 72.2 | 75.9 | 61.5 | — | — | 1066 | 1.5 |
| MAATrack | 73.9 | 71.2 | 57.3 | 24942 | 108744 | 1331 | 14.7 |
| OCSORT | 75.7 | 76.3 | 62.4 | 19067 | 105894 | 942 | 18.7 |
| ByteTrack | 77.8 | 75.2 | 61.3 | 26249 | 87594 | 1223 | 17.5 |
| The method of the disclosure | 78.5 | 76.7 | 63.0 | 24083 | 85927 | 1373 | 33.5 |
| The method of the disclosure* | 78.7 | 77.5 | 63.6 | 24322 | 84532 | 1387 | 20.1 |

TABLE 3

Verification results of core components

| Existence score | Recover overlap | Re-identification module | MOTA↑ | IDF1↑ | IDs↓ | FP↓ | FN↓ |
|---|---|---|---|---|---|---|---|
| — | — | — | 77.03 | 80.43 | 134 | 3206 | 9037 |
| √ | — | — | 77.93 | 80.65 | 137 | 2995 | 8764 |
| √ | √ | — | 78.19 | 81.12 | 133 | 2736 | 8884 |
| √ | √ | √ | 78.27 | 81.85 | 128 | 2807 | 8872 |

The present disclosure provides a multi-object tracking method based on authenticity hierarchizing and occlusion recovery, the verification results of this method on public data sets can be obtained, this method has achieved excellent performance even without introducing occlusion person re-identification module; by introducing the occlusion person re-identification module, it is obviously superior to the existing most advanced multi-object tracking method on the three important indexes of MOTA, HOTA and IDF1, the FN index also shows that it achieves the purpose of reducing the discarding of detection objects by solving the occlusion problem; and the core component effect verification experiment further shows that the three pertinence technologies effectively alleviate the impact of occlusion and improve the tracking performance of the method.

In order to clearly illustrate the interchangeability of hardware and software, in the above description, the composition and steps of each example have been described generally according to the functions. Whether these functions are implemented in hardware or software depends on the specific application and design constraints of the technical solution. Those skilled in the art can use different methods to implement the described functions for each specific application, however, this realization should not be considered beyond the scope of the present invention.

The above description of the disclosed embodiments enables those skilled in the art to realize or use the disclosure. Many modifications to these embodiments will be apparent to those skilled in the art. The general principles defined herein may be implemented in other embodiments without departing from the spirit or scope of this disclosure. Therefore, the present disclosure is not to be limited to the embodiments shown herein, but conforms to the widest scope consistent with the principles and novel features disclosed herein.

What is claimed is:

1. A multi-object tracking method based on authenticity hierarchizing and occlusion recovery, comprising following steps:

acquiring video frame images to be tested;

inputting the video frame images into a trained YOLOX model for a category object detection, and outputting regional coordinates and confidences of all detection objects in the video frame images;

performing an authentic assessment on the detection objects obtained by using existence scores of a comprehensive index, and using confidences corresponding to the detection objects to calculate the existence scores; dividing the detection objects into high-authenticity detection objects and low-authenticity detection objects by setting a score threshold;

associating the high-authenticity detection objects with predicted tracks based on hierarchical results of the detection objects in combination with a hierarchical association strategy, an association basis comprising a position similarity basis and an appearance similarity basis, measuring the position similarity basis by a recovery overlap degree combined with occlusion recovery pre-processing, obtaining the appearance similarity basis by an occlusion person re-identification module, and using a similarity fusion matrix for combination; associating the low-authenticity detection objects with unmatched predicted tracks, and an association basis is a position similarity; and the associating of the high-authenticity detection objects, using matched detection objects to update corresponding predicted tracks, using unmatched detection objects to create new predicted tracks, passing the unmatched predicted tracks into a low-authenticity association link for a secondary association, using the matched detection objects to update corresponding predicted tracks, determining the unmatched detection objects as false detection discarding, and deleting the unmatched predicted tracks after retaining a preset time;

wherein steps of the occlusion recovery pre-processing comprise:

inputting a predicted track coordinate $B^T$ and a detection object coordinate $B^D$:

$$B^T=(x_1^T, y_1^T, x_2^T, y_2^T),\ B^D=(x_1^D, y_1^D, x_2^D, y_2^D);$$

wherein $x_1^T$, $y_1^T$ and $x_1^D$, $y_1^D$ are coordinates of a lower left corner of the predicted track and the detection object, $x_2^T$, $y_2^T$ and $x_2^D$, $y_2^D$ are coordinates of an upper right corner of the predicted track and the detection object;

calculating a width $w^T$ and a height $h^T$ of the predicted track and a width $w^D$ and a height $h^D$ of the detection object:

$$w^T=x_2^T-x_1^T,\ h^T=y_2^T-y_1^T,\ w^D=x_2^D-x_1^D,\ h^D=y_2^D-y_1^D;$$

calculating a center point $C^T$ of the predicted track and a center point $C^D$ of the detection object:

$$C^T = (x_c^T, y_c^T) = \left(x_1^T + \frac{w^T}{2}, y_1^T + \frac{h^T}{2}\right),$$

$$C^D = (x_c^D, y_c^D) = \left(x_1^D + \frac{w^D}{2}, y_1^D + \frac{h^D}{2}\right);$$

calculating a maximum width $w^r$ and a maximum height $h^r$ of the predicted track and the detection object:

$$w^r=\max(w^T,h^T),\ h^r=\max(w^D,h^D);$$

calculating a width $\hat{w}^T$ and a height $\hat{h}^T$ of the predicted track and a width $\hat{w}^D$ and a height $\hat{h}^D$ of the detection object after an occlusion recovery operation:

$$\hat{w}^T=w^T+\beta(w^r-w^T),\ \hat{h}^T=h^T+\beta(h^r-h^T),$$

$$\hat{w}^D=w^D+\beta(w^r-w^D),\ \hat{h}^D=h^D+\beta(h^r-h^D);$$

wherein $\beta$ is an occlusion recovery parameter, indicating a degree of occlusion recovery, and $\beta$ is set to 2; and outputting a coordinate $\hat{B}^T$ of the predicted track after recovery and a coordinate $\hat{B}^D$ of the detection object after recovery, and keeping the center point unchanged in the recovery process:

$$\hat{B}^T = (\hat{x}_1^T, \hat{y}_1^T, \hat{x}_2^T, \hat{y}_2^T) = \left(x_c^T - \frac{\hat{w}^T}{2}, y_c^T - \frac{\hat{h}^T}{2}, x_c^T + \frac{\hat{w}^T}{2}, y_c^T + \frac{\hat{h}^T}{2}\right),$$

$$\hat{B}^D = (\hat{x}_1^D, \hat{y}_1^D, \hat{x}_2^D, \hat{y}_2^D) = \left(x_c^D - \frac{\hat{w}^D}{2}, y_c^D - \frac{\hat{h}^D}{2}, x_c^D + \frac{\hat{w}^D}{2}, y_c^D + \frac{\hat{h}^D}{2}\right);$$

wherein the occlusion person re-identification module is an independent embedded module based on Transformer, the occlusion person re-identification module adopts a ViT model to pre-train on ImageNet-21K and uses a weight after ImageNet1 K fine-tuning as an initial weight, then completes training and testing on MOT17 and MOT20; and the occlusion person re-identification module is configured to extract effective appearance features for re-identification from a limited visible region of occluded objects as the appearance similarity basis;
wherein an acquisition of the appearance similarity basis comprises the following steps:
intercepting region images from the video frames according to coordinates of the detection objects and the predicted tracks, after a size adjustment, as an input m∈ $\mathbb{R}$ H×W×C of the occlusion person re-identification module, wherein H, W and C are height, width and channel number, respectively;
segmenting adjusted images into N fixed-size image blocks $\{m_p{}^n | n=1, 2, \ldots, N\}$, inputting a linear projection layer, and adding extra learnable category embedded tokens;
after inputting a 1–1-layer Transformer encoder, transmitting an initial coding to a global branch and a recombination branch, respectively, wherein the global branch outputs a global feature $f_g$, the recombination branch recombines the image blocks to output k local features $[f_{l_1}, f_{l_2}, \ldots, f_{l_k}]$; and
splicing the global feature and the k local features to obtain integration appearance features:

$$f_i = [f_g, f_{l_1}, f_{l_2}, \ldots, f_{l_k}].$$

2. The multi-object tracking method based on authenticity hierarchizing and occlusion recovery according to claim 1, further comprising using a COCO pre-training weight in the YOLOX model, and completing training and testing on pedestrian datasets CrowdHuman, Cityperson, ETHZ and multi-object tracking data MOT17 and MOT20.

3. The multi-object tracking method based on authenticity hierarchizing and occlusion recovery according to claim 1, wherein the confidences corresponding to the detection objects comprise object confidences and category confidences;
a calculation method of the existence score is: $S_e = (p_{object}{}^\alpha p_{class}{}^{1-\alpha})$,
wherein $p_{object}$ is the object confidence and represents the detection comprising a certainty of a category object and an accuracy of an object region positioning; $p_{class}$ is the category confidence and represents an accuracy of detection category prediction; α is a hyper-parameter, as a weight of the object confidence and the category confidence for a final score, and a value range of α is [0, 1]; and a value range of the existence score Se is [0, 1].

4. The multi-object tracking method based on authenticity hierarchizing and occlusion recovery according to claim 1, wherein an association method of the detection objects and the predicted tracks comprises: using a Hungarian matching algorithm in the multi-object tracking method to achieve the association, wherein an output comprises successfully matched detection objects and predicted tracks, unmatched detection objects and unmatched predicted tracks.

5. The multi-object tracking method based on authenticity hierarchizing and occlusion recovery according to claim 1, wherein the similarity fusion matrix is calculated as follows:

$$C_{ij} = \begin{cases} \min(d_{ij}^{riou}, \xi d_{ij}^{cos}), & \text{if } d_{ij}^{cos} \le \theta_{emb_l} \\ \min(d_{ij}^{riou}, d_{ij}^{cos}), & \text{if } d_{ij}^{riou} \le \theta_{riou}, \theta_{emb_l} < d_{ij}^{cos} \le \theta_{emb_h} \\ d_{ij}^{riou}, & \text{otherwise} \end{cases};$$

wherein $C_{ij}$ is a similarity loss of an $i^{th}$ predicted track and a $j^{th}$ detection object, $d_{ij}^{riou}$ is a recovery overlap distance between two detection regions and represents the position similarity, $d_{ij}^{cos}$ is a normalized cosine distance between two appearance features $e_i^t$ and $f_j^t$ and represents an appearance similarity; ξ is a weight parameter of the normalized cosine distance; and $\theta_{riou}$ is a threshold of the recovery overlap distance, $\theta_{emb_l}$ and $\theta_{emb_h}$ are high and low thresholds of the normalized cosine distance, respectively.

6. The multi-object tracking method based on authenticity hierarchizing and occlusion recovery according to claim 1, wherein a method of updating the predicted tracks is as follows: an exponential moving average mode is used instead of a feature library to update appearance features of the matched predicted tracks, $$e_i^t = \gamma e_i^{t-1} + (1-\gamma) f_i^t;$$

wherein $e_i^t$ and $e_i^{t-1}$ are comprehensive appearance features of an $i^{th}$ predicted track of a current video frame t and a previous frame t−1, respectively, $f_i^t$ is an output feature of the occlusion person re-identification module of the current video frame t, and γ is an update parameter.

7. The multi-object tracking method based on authenticity hierarchizing and occlusion recovery according to claim 1, wherein methods of update, creation and deletion of the predicted tracks are as follows: a track update task uses a Kalman filter as a linear motion model, and updates the predicted track coordinates by regional coordinate information of the successfully matched detection objects; a track creation task is only used for the unmatched detection objects in the high-authenticity association link, and taking the unmatched detection objects as new tracks; and a track deletion task is for the unmatched prediction tracks of the low-authenticity association link, setting a prediction track to retain a number of frames, after reaching the number of frames, the predicted track is deleted directly and not restored.

\* \* \* \* \*